US012154205B2

(12) United States Patent
Fasogbon et al.

(10) Patent No.: US 12,154,205 B2
(45) Date of Patent: Nov. 26, 2024

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Peter Oluwanisola Fasogbon, Tampere (FI); Sujeet Shyamsundar Mate, Tampere (FI); Yu You, Kangasala (FI); Igor Danilo Diego Curcio, Tampere (FI); Emre Baris Aksu, Tampere (FI); Ville-Veikko Mattila, Tampere (FI); Francesco Cricrì, Tampere (FI)

(73) Assignee: Nokia Technologies Oy, Espoo (FI)

( * ) Notice: Subject to any disclaimer, the term of this patent is extended or adjusted under 35 U.S.C. 154(b) by 121 days.

(21) Appl. No.: 17/933,624

(22) Filed: Sep. 20, 2022

(65) Prior Publication Data
US 2023/0102054 A1 Mar. 30, 2023

(30) Foreign Application Priority Data
Sep. 30, 2021 (FI) .................................. 20216011

(51) Int. Cl.
*G06F 3/16* (2006.01)
*G06T 13/40* (2011.01)
(Continued)

(52) U.S. Cl.
CPC ............... *G06T 13/40* (2013.01); *G06F 3/16* (2013.01); *G06T 17/00* (2013.01); *G06T 19/20* (2013.01)

(58) Field of Classification Search
CPC .................................. G06T 13/40; G06F 3/16
See application file for complete search history.

(56) References Cited

U.S. PATENT DOCUMENTS

2015/0301592 A1* 10/2015 Miller .................. G02B 27/017
345/156
2017/0178272 A1* 6/2017 Lashkari .................. G06T 1/20
(Continued)

FOREIGN PATENT DOCUMENTS

WO 2022/074294 A1 4/2022

OTHER PUBLICATIONS

Cha YW, Price T, Wei Z, Lu X, Rewkowski N, Chabra R, Qin Z, Kim H, Su Z, Liu Y, Ilie A. Towards fully mobile 3D face, body, and environment capture using only head-worn cameras. IEEE transactions on visualization and computer graphics. Sep. 11, 2018;24(11):2993-3004. (Year: 2018).*

(Continued)

*Primary Examiner* — Diane M Wills
(74) *Attorney, Agent, or Firm* — Joseph C. Drish; McCarter & English, LLP

(57) ABSTRACT

The embodiments relate to a method comprising establishing a three-dimensional conversational interaction with one or more receivers; generating a pointcloud relating to a user and capturing audio from one or more audio source; generating conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from said one or more audio source and input obtained from one or more connected devices controlling at least the pointcloud, wherein said objects are linked to each other for seamless manipulation; applying the conversational scene description into a metadata, and transmitting the metadata with the respective audio in realtime to said one or more receivers.

23 Claims, 16 Drawing Sheets

(51) Int. Cl.
   *G06T 17/00* (2006.01)
   *G06T 19/20* (2011.01)

(56) References Cited

U.S. PATENT DOCUMENTS

| | | | |
|---|---|---|---|
| 2020/0005523 A1* | 1/2020 | Brebner | H04W 4/021 |
| 2021/0041957 A1 | 2/2021 | Chen et al. | |
| 2021/0099773 A1 | 4/2021 | Bouazizi et al. | |
| 2021/0105451 A1 | 4/2021 | Oyman et al. | |
| 2021/0297460 A1 | 9/2021 | Bouazizi et al. | |
| 2021/0350604 A1* | 11/2021 | Pejsa | G06T 19/006 |

OTHER PUBLICATIONS

He Z, Du R, Perlin K. Collabovr: A reconfigurable framework for creative collaboration in virtual reality. In2020 IEEE International Symposium on Mixed and Augmented Reality (ISMAR) Nov. 9, 2020 (pp. 542-554). IEEE. (Year: 2020).*

Wang, Shiyao, et al. "Augmented reality as a telemedicine platform for remote procedural training." Sensors 17.10 (2017): 2294. (Year: 2017).*

Extended European Search Report received for corresponding European Patent Application No. 22196265.7, dated Feb. 28, 2023, 11 pages.

"3rd Generation Partnership Project; Technical Specification Group Services and System Aspects; Extended Reality (XR) in 5G (Release 16)", 3GPP TR 26.928, V1.2.3, Feb. 2020, 130 pages.

"3rd Generation Partnership Project; Technical Specification Group SA; Support of 5G Glass-type Augmented Reality / Mixed Reality (AR/MR) devices; (Release 17)", 3GPP TR 26.998, V0.9.0, Aug. 2021, pp. 1-87.

Manolova et al., "Challenges for real time long distance holoportation to enable human bond communication", 42nd International Conference on Telecommunications and Signal Processing (TSP), Jul. 1-3, 2019, pp. 529-534.

Finnish Application No. 20215344, "A Method, an Apparatus and a Computer Program Product for Video Encoding and Video Decoding", filed on Mar. 26, 2021, pp. 1-25.

Finnish Application No. 20216003, "A Method, an Apparatus and a Computer Program Product for Video Encoding and Video Decoding", filed on Sep. 28, 2021, pp. 1-22.

"Information technology—Coded representation of immersive media—Part 14 : Scene Description for MPEG Media", ISO TC JTC/SC 29/WG 03, ISO 23090-14:2021 E, 2021, 71 pages.

"Information technology—Computer graphics, image processing and environmental data representation—Part 1: Humanoid animation (HAnim) architecture", Humanoid Animation, ISO/IEC 19774-1, 2019, 240 pages.

Information technology—Computer graphics, image processing and environmental data representation—Part 2: Humanoid animation (HAnim) motion data animation, ISO/IEC 19774-2, 2019, 72 pages.

"HumanoidAnimation (HAnim) X3D Examples Archive", Web3D Consortium, Retrieved on Sep. 29, 2022, Webpage available at : https://www.web3d.org/x3d/content/examples/HumanoidAnimation/.

"Take a Look at Facebook's New VR Avatars for Quest", VRScout, Retrieved on Sep. 29, 2022, Webpage available at : https://vrscout.com/news/facebooks-new-vr-avatars-for-quest/amp/.

"Microsoft Mesh", Microsoft, Retrieved on Sep. 29, 2022, Webpage available at : https://www.microsoft.com/en-us/mesh?activetab=pivot%3aprimaryr7.

"Explore the Metaverse", Spatial, Retrieved on Sep. 29, 2022, Webpage available at : https://spatial.io/.

"Information technology-Coded representation of immersive media (MPEG-I)—Part 8: Network Based Media Processing", ISO/IEC JTC1/SC29/WG11, ISO 23090-8:2018, 2018, 49 pages.

Office action received for corresponding Finnish Patent Application No. 20216011, dated May 12, 2022, 11 pages.

* cited by examiner

| interface Human | | | |
|---|---|---|---|
| String | description | " " | |
| String | name | required name | |
| Sequence<string> | info | [] | |
| Integer | lei | -1 | [-1,4] |
| Float[3] | center | [0.2, -0.3, 0.4] | (-∞,∞) |
| Sequence<object> | keypoints | [] | [Keypoint] |
| One time requirement | | | |
| Sequence<object> | MeshData | [] | (Obj and texture image) |
| Optional | | | |
| Sequence<object> | Skeleton | [] | [Keypoint, Site] |
| Sequence<object> | segments | [] | [Segment] |
| Sequence<object> | sites | [] | [Site] |
| Sequence<object> | trackpoints | [] | [Site] |
| Float[3] | translation | [0,0,0] | (-∞,∞) |
| Float[4] | rotation | [0,0,1,0] | (-∞,∞) |
| Float[3] | scale | [1,1,1] | (0,∞) |
| Float[4] | scale vector | [0,0,1,0] | (-∞,∞) |
| Sequence<object> | LBSData | [] | (Support for LBS parameters and GLTF2.0) |

Fig. 4

```
interface Audio
{
    String           description    " "
    String           name           required name
    Sequence<string> info           [ ]
    Float[3]         center         [0, 0, 0]

Sequence<object> Children       [ ]

Optional
    Float[3]         translation    [0, 0, 0]         (-∞,∞)
    Float[3]         scale          [1, 1, 1]         (-∞,∞)
                                                      (0,∞)

Sequence<object> A-sites           [ ]            [A-Site]
    Sequence<object> A-listenpoints    [ ]            [A-Site]
}
```

Fig. 5

```
interface A-Site
{
    String      description     ""
    String      name            required name
    Float[3]    centerOfMass    [0.3 0.1 0.7]    (-∞,∞)
    Sequence<float3>  coordinates  []            (-∞,∞)
    Sequence<object>  Children     []            [any object defined]

Optional
    Float[3]    translation     [0.0 0]          (-∞,∞)
    Float[3]    scale           [1 1 1]          (0,∞)
}
```

Fig. 6

```
interface A-Segment
{
    String          description       " "
    String          name              required name
    Float[3]        centerOfMass      [0.3 0.1 0.7]
    Sequence<float3> coordinates      []           (-∞,∞)
                                                   (-∞,∞)
    Sequence<object> Children         []           [A-Site]
}
```

Fig. 7

```
interface Event
{
    String          description    " "
    String          name           required name
    Sequence<string> info          []
    Sequence<string> messages      []
    Float[3]        center         [0, 0, 0]      (-∞,∞)

Sequence<object> Children      []             [ Segment, A-Segment]

Optional
    Float[3]        translation    [0 0 0]        (-∞,∞)
    Float[3]        scale          [1 1 1]        (0,∞)
}
```

Fig. 8

METHOD, AN APPARATUS AND A COMPUTER PROGRAM PRODUCT FOR VIDEO ENCODING AND VIDEO DECODING

TECHNICAL FIELD

The present solution generally relates to computer graphics, in particular to computer generated animation.

BACKGROUND

Computer generated animation is a field of computer graphics, where moving images are created by using computers. Computer animation may be based on three-dimensional (3D) computer graphics. In order to represent movement of an object, an image comprising the object is displayed on the computer screen, and replaced by a new image that is similar to the previous image, but shifted slightly. For 3D animations, objects are built on the computer monitors, and 3D figures are rigged with virtual skeleton.

EXtended reality (XR) is a concept that covers all computer-altered reality areas such as Augmented Reality (AR), Mixed Reality (MR) and Virtual Reality (VR). A concept of using 3D pointcloud in realtime XR conversation is gaining lots of momentum and resource of popularity lately. This is mostly due to sudden increase in Augmented Reality (AR) deployment capabilities, Virtual Reality (VR) headmounted displays available to the consumer market, as well as accessibility and affordability of these devices for Mixed Reality (MR) experiences.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a sender apparatus comprising means for establishing a three-dimensional conversational interaction with one or more receivers; means for generating a pointcloud relating to a user and obtaining real or virtual audio from one or more audio source; means for generating conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; means for applying the conversational scene description into a metadata, and means for transmitting the metadata with the respective audio in realtime to said one or more receivers.

According to a second aspect, there is provided a receiver apparatus comprising means for receiving a metadata with respective audio from a sender; means for unpacking conversational scene description from the metadata, the conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; means for composing the conversational scene based on the objects and respective audio; and means for rendering the conversational scene to a display.

According to a third aspect, there is provided a method for a sender device, comprising: establishing a three-dimensional conversational interaction with one or more receivers; generating a pointcloud relating to a user and obtaining real or virtual audio from one or more audio source; generating conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; applying the conversational scene description into a metadata, and transmitting the metadata with the respective audio in realtime to said one or more receivers.

According to a fourth aspect, there is provided a method for a receiver device, comprising: receiving a metadata with respective audio from a sender; unpacking conversational scene description from the metadata, the conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; composing the conversational scene based on the objects and respective audio; and rendering the conversational scene to a display.

According to a fifth aspect, there is provided an apparatus comprising at least one processor, memory including computer program code, the memory and the computer program code configured to, with the at least one processor, cause the apparatus to perform at least the following: establish a three-dimensional conversational interaction with one or more receivers; generate a pointcloud relating to a user and obtain real or virtual audio from one or more audio source; generate conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; apply the conversational scene description into a metadata, and transmit the metadata with the respective audio in realtime to said one or more receivers.

According to a sixth aspect, there is provided an apparatus comprising at least one processor, memory including computer program code, the memory and the computer program code configured to, with the at least one processor, cause the apparatus to perform at least the following: receive a metadata with respective audio from a sender; unpack conversational scene description from the metadata, the conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; compose the conversational scene based on the objects and respective audio; and render the conversational scene to a display.

According to a seventh aspect, there is provided a computer program product comprising computer program code configured to, when executed on at least one processor, cause an apparatus or a system to: establish a three-dimensional conversational interaction with one or more receivers; generate a pointcloud relating to a user and obtain real or virtual audio from one or more audio source; generate conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; apply the conversational scene description into a metadata, and transmit the metadata with the respective audio in realtime to said one or more receivers.

According to an eighth aspect, there is provided a computer program product comprising computer program code configured to, when executed on at least one processor, cause an apparatus or a system to: receive a metadata with respective audio from a sender; unpack conversational scene description from the metadata, the conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; compose the conversational scene based on the objects and respective audio; and render the conversational scene to a display.

According to an embodiment, the point cloud represents a three-dimensional avatar humanoid with or without skeletal keypoints.

According to an embodiment, the audio is segmented into audio sources, which comprise real as well as virtual audio sources. The real audio sources are the audio sources in the vicinity of the sender user, the virtual audio comprises virtual audio sources related to the user (e.g., virtual audio playback from key board sounds, audio corresponding to the virtual visual content).

According to an embodiment, objects being referred from the conversational scene description are connected to one another by a same geometrical coordinate system relative to one global origin.

According to an embodiment, wherein the three-dimensional conversational interaction is established by indicating the animation capability modes.

According to an embodiment, wherein the animation capability mode is a skeletal animation or a pointcloud animation.

According to an embodiment, the computer program product is embodied on a non-transitory computer readable medium.

DESCRIPTION OF THE DRAWINGS

In the following, various embodiments will be described in more detail with reference to the appended drawings, in which

FIG. 4 shows an example of a human object representation;

FIG. 5 shows an example of an audio object representation;

FIG. 6 shows and example of A-site object representation

FIG. 7 shows an example of A-segment object representation;

FIG. 8 shows an example of event object representation;

DESCRIPTION OF EXAMPLE EMBODIMENTS

Figure 1:
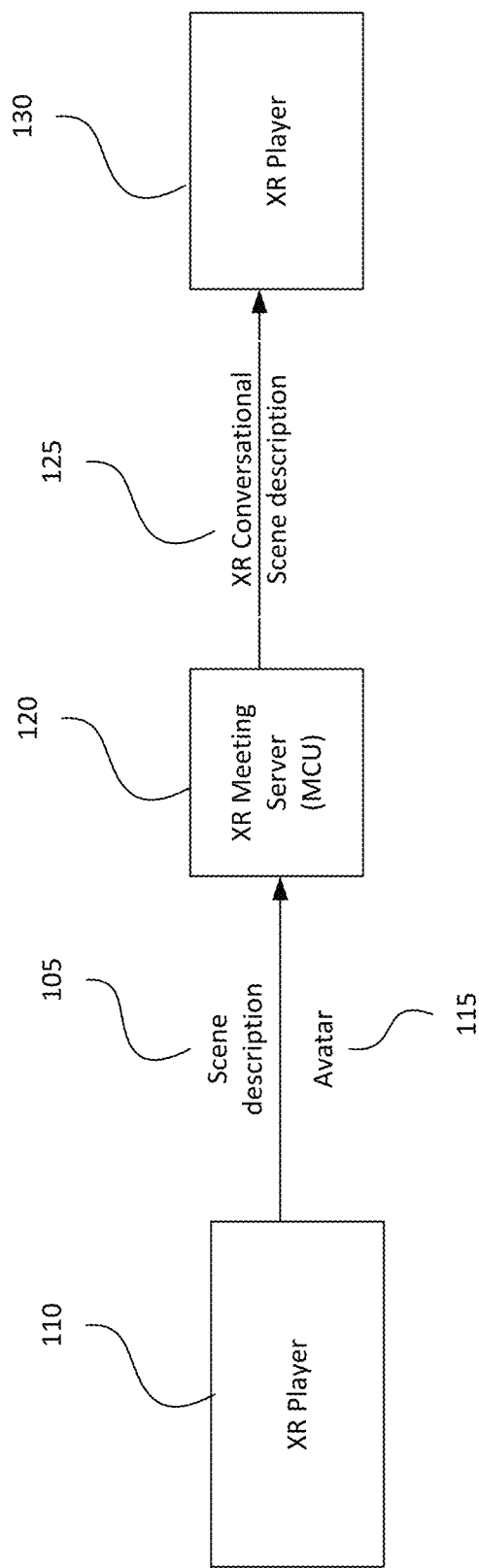
FIG. 1 shows an example use case where XR conversational scene description metadata is generated from 3D Avatar humanoid description.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment is included in at least one embodiment of the disclosure.

MPEG-I Scene Description (ISO 23090-14:2021(E)) is a new MPEG standard that defines extensions to the gITF format (gITF 2.0), which provides a tight integration of timed data describing a 3D scene, e.g. containing description of node hierarchy, materials, cameras, as well as description information for meshes, animations, and other constructs. The scene description effort at this current stage is relatively static-rigid in its structure which makes it difficult to be used for 3D XR conversation/call without few tweaks and extensions.

The aim of the present embodiments is to present a metadata structure for XR conversational scene description, which can be seen as an extension and/or compatible with classical scene description in MPEG. The proposed metadata structure allows and defines several multimodal source of inputs capabilities (virtual and non-virtual sources) such as visual, audio, live commands from controllers, text message and haptics for sense of touch. These input capabilities can be best linked to moving objects (e.g. nodes in the scene description), for example, 3D avatars when these objects are available. Such binding allows smooth 3D immersive communication (e.g. conversation) with support of different modalities. The metadata structure can also define the potential mapping and conversion between different modalities, so that people who have different input capabilities can still interact with each other. This is best solved by defining 3D avatar as part of a scene description and linking all connected devices to the avatar. The proposed metadata structure is generated so that it allows proper signalling of audio-visual-virtual device capabilities, including connections, and real-time displacement of avatars connected in the call session based on visual, audio or geolocalization information.

In current VR, AR, MR scene updates, animations described by classical scene description in MPEG are relatively static-rigid in their structure with respect to the high frequency of updates and content changes. This means that most of scene objects remain unchanged over time, e.g. space structure, stationary objects, etc. Classic scene description can be seen as playback, streaming use case with low frequency scene updates with individual elements in the scene with dynamic position supported as animations. The animations are generated as timed metadata track samples, hence it is more suitable for streaming than conversational applications. Scene updates are typically used for adding, removing or modifying a scene element. This data is stored in binary (gITF). There is a mechanism via a timed metadata track with exact temporal indication for when to start or stop the animation. This timed metadata track is temporally aligned with the media data and the scene description.

Figure 9:
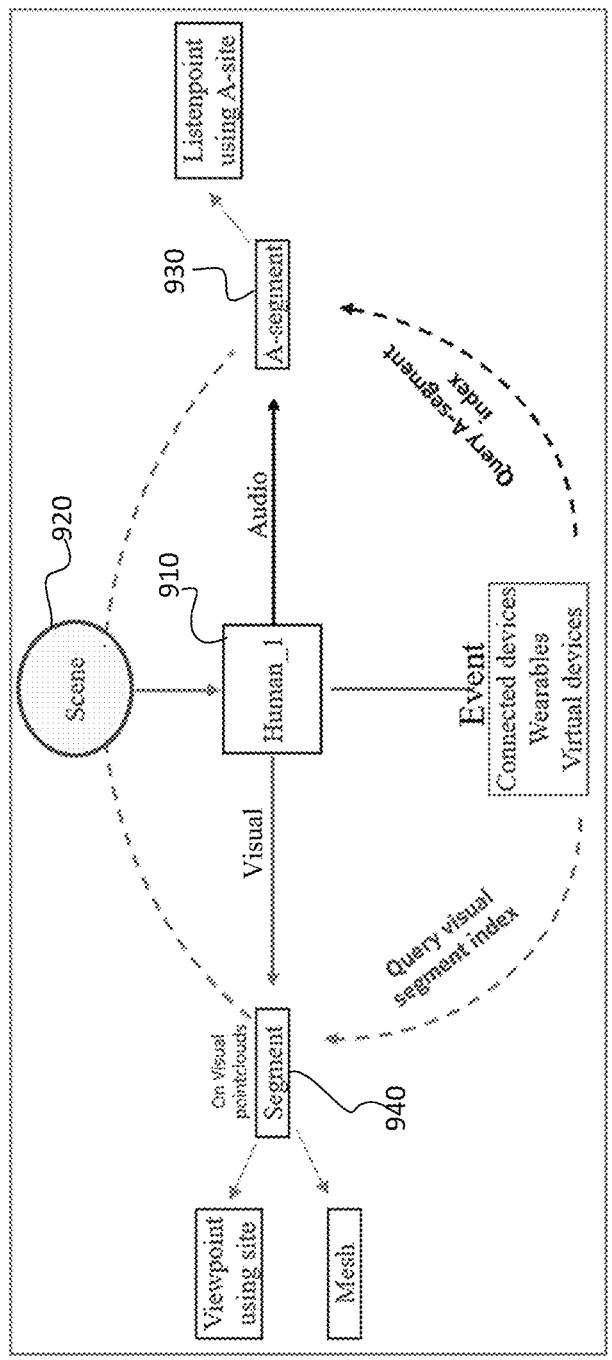
FIG. 9 shows an example of a linkage between the metadata objects and retrieval process.

In the case of XR conversational use case, adding or removing the avatar is the functionality which may be done with scene update in MPEG scene description. This makes the current scene description not suitable for 3D XR conversation/call that requires high frequency updates for avatar and several connected devices from multimodal inputs. In other words, a structure which is amenable to continuously changing as well as suitable for creation of the structures in real time for scene representation. Example of connected inputs to the caller or "Human 1" in FIG. 9, are, but not limited, to devices providing command actions, audios, live text messages during call, haptics for touch feeling, connected devices depicting changes in background objects (e.g., GPS (Global Positioning System) information) live updates in virtual environment (digital twin) that can be transported back and forth for re-enactment. For example, virtual digital twin environment representation in gltf2.0 or scene description can be sent in the call's sign-in section (or initialization step) so that a caller can be re-enacted in the virtual digital twin environment, and can be updated in real-time (i.e. conversational or low latency) during a live call session. In addition, GPS information can be used to re-enact a moving caller for an outdoor scene. These are so complex that current scene description does not necessarily support for avatar calls.

In addition, another difference from scene description is that a part of the scene update is delivered as a JSON patch. However, the scene description standard does not describe how the scene update is handled. The metadata according to present embodiments is such that it is designed to handle the entire scene to change continuously; so there is no static description of the scene which needs an update. In 3D Avatar XR call (peer-2-peer), avatars (humanoids) may be treated separately. And they can be seen as "external" entities to the VR Scene description, as the avatars, can come and go; also, their spatial location may change more often (e.g. move around). Indeed, the structure is not flexible enough (difficult manipulation) to be used to update and manipulate a 3D avatar and its attachments at high frequency. XR scene description requires high frequency updates and an avatar in the scene is seen as a dynamic content with attached inputs. The avatar is associated to several parts of the scene as nodes in the structure proposed, and they all have connected components, skeleton audio, etc.

FIG. 1 shows an example use case where XR conversational scene description 125 metadata is generated from three-dimensional (3D) avatar humanoid description 115. This figure summarizes the relation between the XR conversational scene description 125 according to present embodiments and a classical 3D Avatar humanoid description 115 and a classical scene description 105 in MPEG. Under the MCU mode, the aggregated XR conversational scene description may be created by the meeting server (MCU) 120 and shared with all players 130.

In the present embodiments, a storage container/structure (known as metadata) is proposed to support XR conversational scene description and updates. This will provide a structure for all connected devices regardless of the source, allow signalling of virtual events from virtual sources such as virtual command (e.g., in game sessions), virtual keyboard that can arrive from wrist wearables and/or visual hand gestures, and easily integrate or extended on current scene description under MPEG standards.

Classical scene description under MPEG is an extension to gltf2.0. The MPEG document defines features of a scene description that describe a scene. The file format provides a tight integration of timed data with the scene description that includes components such as Media Access Function, Presentation Engine, Buffer Control & Management, Storage, Transport and Pipelines. The metadata according to embodiments work can be seen as extension and/or complement to classical scene description in a way that that is consistent with MPEG formats. This makes it possible to use in real XR conversational service using 3D avatar.

The present embodiments relate to XR scene description for 3D XR calls, where a method for low latency parameter description for multimodal data is described to achieve the description of the XR scene elements displacement during a live call. The improvement is based on a tree structure and interdependencies between a scene and displaceable avatar which holds its connected input capabilities from various multimodal inputs. The structure allows geometrical, density and other form of transformation of Avatar and its connected inputs in a virtual scene. Another thing missing in prior work in MPEG scene description is virtual events. This is also covered by the present embodiments. Virtual events can be created from a human gesture using action recognition methods or signal processing of wearable device outputs. The proposed metadata structure is centered on avatar in the scene which enables manipulating and signaling virtual events enacted by any avatar during the call. For example, one avatar can have full head gear like AR glass, wearable touch keyboard (input), 3D audio input HW, etc. Another one might use only restricted device, such as a web browser or similar. The metadata extension can also be used to add the device capability description and potential conversion from one type of input to another type, so high portability can be achieved with different HW vendors.

Figure 2:
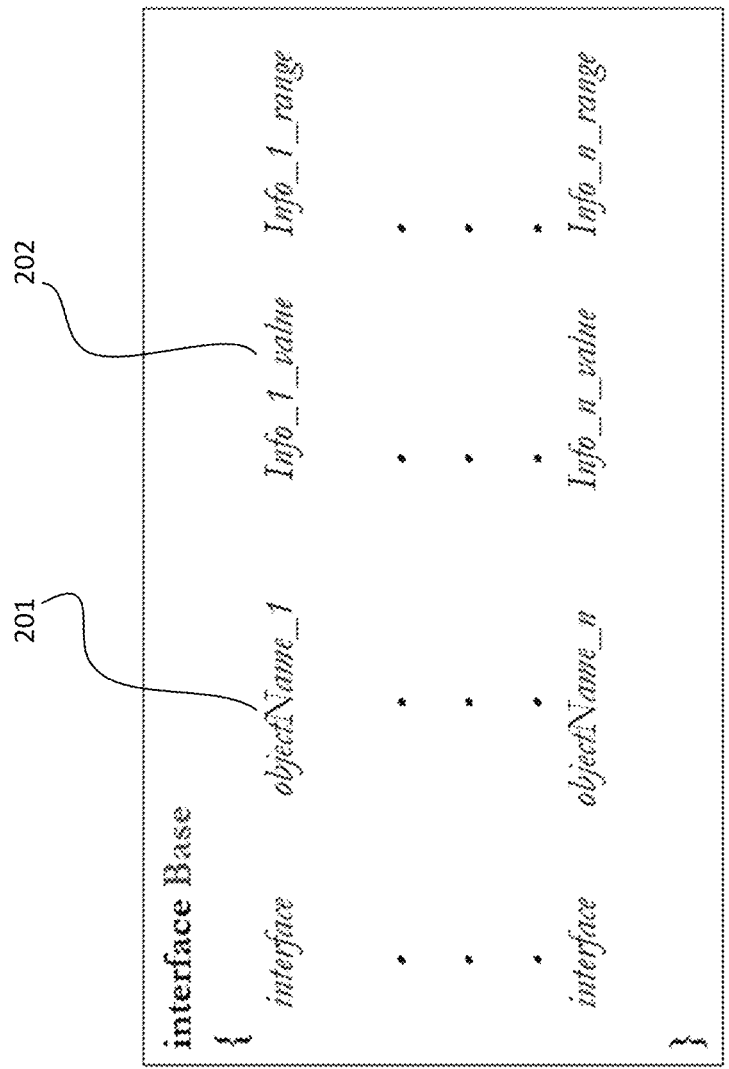
FIG. 2 shows an object interface for the metadata according to present embodiments.

In this disclosure a set of metadata is disclosed to handle objects specific to XR scene description for 3D avatar conversation involving several connected devices. As part of the present embodiments, a metadata structure as the basic elements container resource is proposed to handle 3D avatar and associated connected devices. FIG. 2 shows an example of a basic elements container, which is defined as a resource to handle all multimodal input.

As shown in FIG. 2, the object interface is denoted as Base, and is defined in the metadata structure. The base interface describes the virtual space (also known as virtual scene such as classical scene description or gltf2.0) where a call or some other digital conversation or communication is being made. The proposed object interface can be extended to support other class of information connected to the 3D avatar that may not have been mentioned in this disclosure. The proposed interface has been designed to allow better operability and integrability for future extensions as a new object interface. For example, objectName_1 interface 201 can specify human avatar described, objectName_2 interface can specify audio sources related to the human avatar or to another reference position in the scene, objectName_3 interface can specify haptic wearables worn by human avatar etc. The audio source can be real or virtual or their combination. The real audio sources correspond to audio emitters in the human's surroundings whereas the virtual audio sources related to the virtual audio scene connected to the human in the XR conversation.

Info_1_value 202 to Info_n_range provide additional information specific to the specified object. For example, a flag information can be inserted to indicate that an objectName (e.g human) is an anchor or reference. In many scenarios there can be many humans or even something else can be the anchor or reference to the base. So these flags append to each object interface can be used by the Base about which of the interfaces in the Base is the reference. In case of a single human as anchor in the scene, only the Human interface will have the reference flag located within the info_equal to 1. In such a case all the other interfaces are with respect to the one with reference flag equal to 1. In case of multiple humans or scene with multiple reference flag equal to 1, the referring objects carry the reference object ID.

In one processing pipeline, several interfaces under Base representing different multimodalities are connected to one another by the same geometrical coordinate systems referenced relative to one global origin (0,0,0) belonging to the Base.

The way how the structure has been defined allows a good and seamless linkage between humanoid avatar and audio source properties. Indeed, a scene description allowing seamless dependencies retrieval between various interfaces has been proposed. In addition, these representations support virtual events, which can enable audio manipulation and augmentations.

The parameter metadata can be implemented as any type of extension to any metadata formats depending on the data transmission/transport protocols. The parameters comprise timed information generated dynamically and essential to post-processing or rendering tasks for reacting according to the dynamic information represented by the metadata.

Scene Interface

Figure 3:
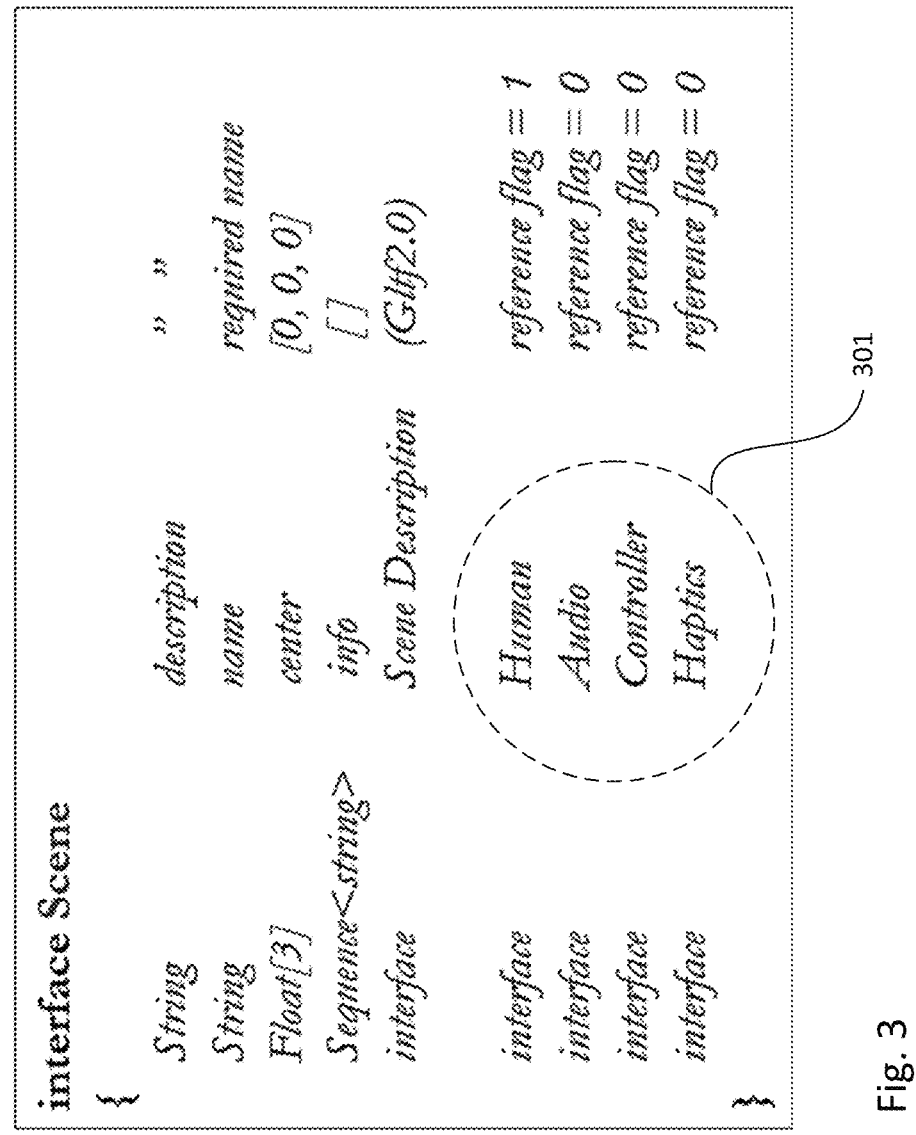
FIG. 3 shows an example of a scene object representation.

Using the interface structure in FIG. 2, the system can create dynamic metadata using the interface format for real-time 3D avatar conversation to give Scene in FIG. 3. This object represents a dynamic object "Scene" describing a physical space. The object defines a container for Humanoid, Audio, Controller, Haptics, Virtual environment objects 301 that support the XR conversational service. Other fields that are not mentioned that can support this service can be extended as object interface in the future.

The description field describes information that can be affixed on the object for proper backlogging and retrieval. The name field, which shall be present, and not have the empty string value, stores the name of the space defined by the Scene object. The center field specifies the coordinate value for the human object from a global coordinate system origin (0,0,0). This is particularly useful to have a reference in situation where there is more than one scene interconnected, this will serve as a means to link them all to common global coordinate origin. The info field consists of a sequence of strings, each of which is of the form term=value. Possible terms include but not limited to callName, callId, callSessionInfo, creationDate, privacyLevel, GPSInfo, callType, usageRestrictions, mobileOperator, nbCallersSession etc.

The Human field provides hierarchy and linkage to connected devices and under a scene description. This encompass visual information that relate to pointclouds and/or compressed representation such as skeletal keypoints (which can enable low bandwith XR conversation system). Controller and haptics interface both encompass information from wearable, haptics and trackable devices that can be worn or connected by human. Scene description interface represents a virtual environment which can be represented in gltf2.0 format. This is optional but if provided, the caller can be renacted in a predefined virtual environment at the receiver's side. Finally, Audio represents sound source information and has direct implicit linkage to human or to the human's surroundings/physical space.

Human Interface

FIG. 4 illustrates an example of a Human interface. This interface relates to all visual entities pertaining to individual human under 3D avatar call. Human can be represented as raw pointclouds, and/or compressed format with skeletal keypoints. The proposed data structure defines info field that specify possible term values such as callerName, age, gender etc. There may also be a callType which indicates level of information available to start the call such as "face only" type of call or "full body" or "upper body" which makes it compatible to devices such as Facebook Vrscout, Microsoft Mesh and Spatial.io. Additional fields termed segment, sites are provided to support various functionalities. Segment are inferred based on callType, to determine parts of Keypoints that belong to a particular segment e.g "Face segment". In addition, Segment incorporates MeshData that are specific to particular human body segment. For example site allow customized viewport for camera placement and its placement optimization tasks.

Audio Interface

An audio interface is illustrated in FIG. 5. The audio interface represents a dynamic object "audio" in a physical scene. The description field describes information that can be affixed on the object for proper backlogging and retrieval. The name field, which shall be present, and not have the empty string value, stores a name for the object. The info field consists of a sequence of strings, each of which is of the form term=value. Possible terms include but not limited to audioFormat, creationDate, timeStamps, nbAudios, confidenceLevel, audioExtent, audioDirectivity. The info field term=value pairs can be extended as needed for specific application related to audio services. The center field specifies the coordinate value for the audio object from a global coordinate system origin (0,0,0). This is particularly useful to have a reference when there is multiple classified audio sources. This global reference coordinate can be specified as the center of the visual-human object or center of the Scene if there are multiple visual objects involved.

The Children specify classified raw audio signals from mics, background, human, keyboard noise with their classification information. The translation field specify translation of audio source to global coordinate "scene" and can also create linkage to human object also if required. Scale specify amplification level of noise in global coordinate which the caller can specify or can be requested by the receiver.

A-listenpoints (also known as Audio-listenpoints) is the audio alternative to Viewpoint under human interface. This encompass the audio source and receiver listening related information. A-listenpoints uses A-site to generate a location to place the audio source based on callType. The A-listenpoints field can contain zero or more A-Site object definitions which can be seen as a way to simulate sound augmentation and re-enactment. The augmentation and re-enactment relates to, for example, generation of additional sounds based on footstep movements which were not captured and delivered from the real avatar but added during playback.

A-Site Object

An example representation for A-Site Object is shown in FIG. 6. The name field is the only field which shall be defined, and which shall not have the empty string value. All the other fields are optional. Each A-Site object shall have a name field that is used for identifying the object, typically based on names for hearpoint. A-Site objects that are used to define hearpoint locations shall have a "_hear" suffix appended. A-Site objects that are defined in this manner are intended to be used as attachment points from which a certain sound source can be heard i.e., locations for virtual speaker/sound source in the reference frame of the Human and/or Scene object. The A-Site objects defined within this field are affected only by the global transformations applied to the Human object in the Scene. The center of mass and translation can be defined for virtual placement of audios and support optimization operations.

A-Segment Object

FIG. 7 illustrates an example of a A-segment object representation. This object is a container for information about an A-segment (Audio-Segment) of the scene. In the example of FIG. 7, the name field is the only field which shall be defined, all the other fields are optional. However, it is to be noticed that those fields are still required to be part of the interface, even if none of the actual A-Segment objects define values for those fields.

In practice, A-segment can be seen as segmentation of sound sources hinged on its influence to human avatar. A-Segment are inferred based on number of sound types classification output from the scene, (1) background noise, (2) which part of the Human is the sound emanating. The output is a form of classification to various segments on human (face, hands where wearables might be located) and background. These classification can be done with deep neural-network based methods. A-segment's children uses A-site to define where to place audio for hearing at that particular A-segment location.

The coordinates define float3 representing object encompassing A-segment, and the centerOfMass is calculated from this encompassment. Any A-Segment object can also contain zero or more A-Site objects in the children field, which allow landmarks to be established with respect to the specific A-Segment. These A-segment, A-sites provides additional capabilities that support various sound functionalities, which can be extended and improved.

In practice, audio source emanating from both facial segment and background segment during an avatar call can be called from its A-segment, A-sites relation using alias name as "_Aface_hear" suffix appended or "_Abackground_hear" respectively.

Haptics, Event and Controller Objects

For simplicity name "Event" interface is used for all the other connected source of multimodal inputs, as described in FIG. 8. This representation is based on the Base interface defined with respect to FIG. 2. The center field specifies the coordinate value for the human object from a global coordinate system origin (0,0,0). This global reference coordinate can be specified as the center of the visual-human object or center of the Scene if there are multiple visual objects involved. The message field can include text messages for keyboard device. The Children field encompass an hierarchy object linkage to both Segment and A-Segment if available.

FIG. 9 summarizes the object interfaces interdependencies, connectivities and retrieval in the XR conversational scene description. FIG. 9 assumes a single human 910 in the scene 920, such that the audio emanating from him/her and his/her surroundings are classified into A-segments 930 with "indexes" specifying whether it's a background noise, or sound emanating from human body, or from connected devices. Each connected devices object interfaces have a common reference global coordinate to Human_1. Thereafter, their linkage and connectivities to Segment 940 and A-segment 930 can also be queried, retrieved and updated if available as shown in FIG. 9.

Use Case

Figure 10:
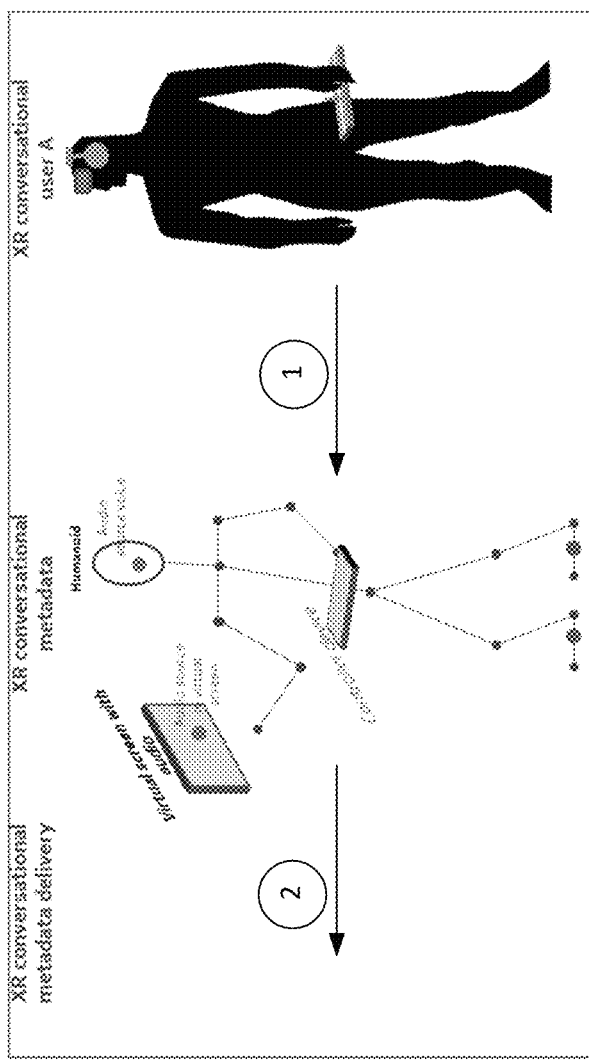
FIG. 10 shows an example of processing steps for XR conversational metadata from Sender's side
Figure 11:
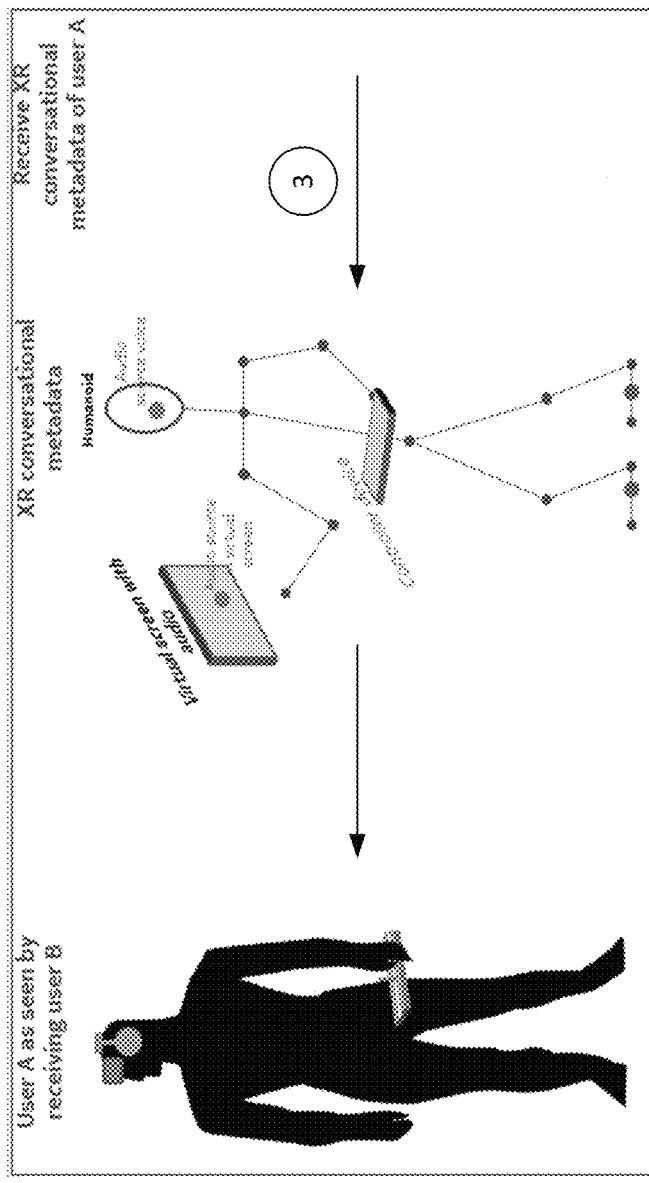
FIG. 11 shows an example of processing steps for XR conversational metadata at the receiver's side

FIGS. 10 and 11 illustrate example use cases between user A and user B participating in an XR conversation, whereby both users are interacting in real conversation and watching, for example, a virtual Netflix on the wall depicted as "virtual screen" in the figures. The virtual screen where the Netflix is placed, is rendered through the HMD wearable devices used by the participants. This Netflix on the wall can be supported by XR Spatial Computing Service.

Sender (User A)

FIG. 10 illustrates processing steps for the XR conversational metadata from the sender user A side. From FIG. 10, it is assumed that User A is in possession of some smart devices that have been connected in the beginning of the call. An example of the connected devices is the remote controller which can be used to manipulate runtime request for privacy declaration which can initiate change of listenpoint and/or viewpoint to specific segments from reenacted user B. The privacy can also be related to what has been watched together on the virtual screen. In another embodiment, the user A can make a keyboard gesture with his hand as a "virtual event" which will directly overlay a virtual keyboard with simulated sound in the virtual environment perceived from User B's side. In another embodiment, the controller can be virtual or physical user interface that can make runtime request to update changes to the metadata.

For the process, at first (1) a visual capture is modified into the pointcloud (3D avatar) and then processed into visual information that allow skeletal hierarchy, segments creation, and other representation that can be used to setup the human interface. Point cloud, audio and additional virtual devices are transformed to XR conversational metadata. This may be very critical since all the XR conversational entities are linked to human and their segments. When this is established, then other connected devices can be resolved to the humanoid and thereafter audio linkage can be established in the scene. Thereafter (2), the package XR metadata are sent for realtime delivery (with appropriate timestamps and update frequency) using appropriate transport protocol.

Receiver (User B)

FIG. 11 illustrates processing steps for the XR conversational metadata from the receiver (user B) side. In FIG. 11 it is assumed that User B is in possession of some smart devices that have been connected in the beginning of the call, such as headphone and HMD to recreate the interactions. With the controller which can also be a virtual user interface, he/she has the right of privacy to what he can view form user A. For the process, the XR metadata of User A and its environment is unpacked (3), which can be used to compose a 3D scene comprising of the 3D avatar, the connected audio sources and connected devices. In order to complete the scene composition, text is applied and audio is rendered. Also runtime commands from the controller devices are applied at appropriate time.

Reenactment of the XR Metadata for 3D Avatar Conversation

Figure 12:
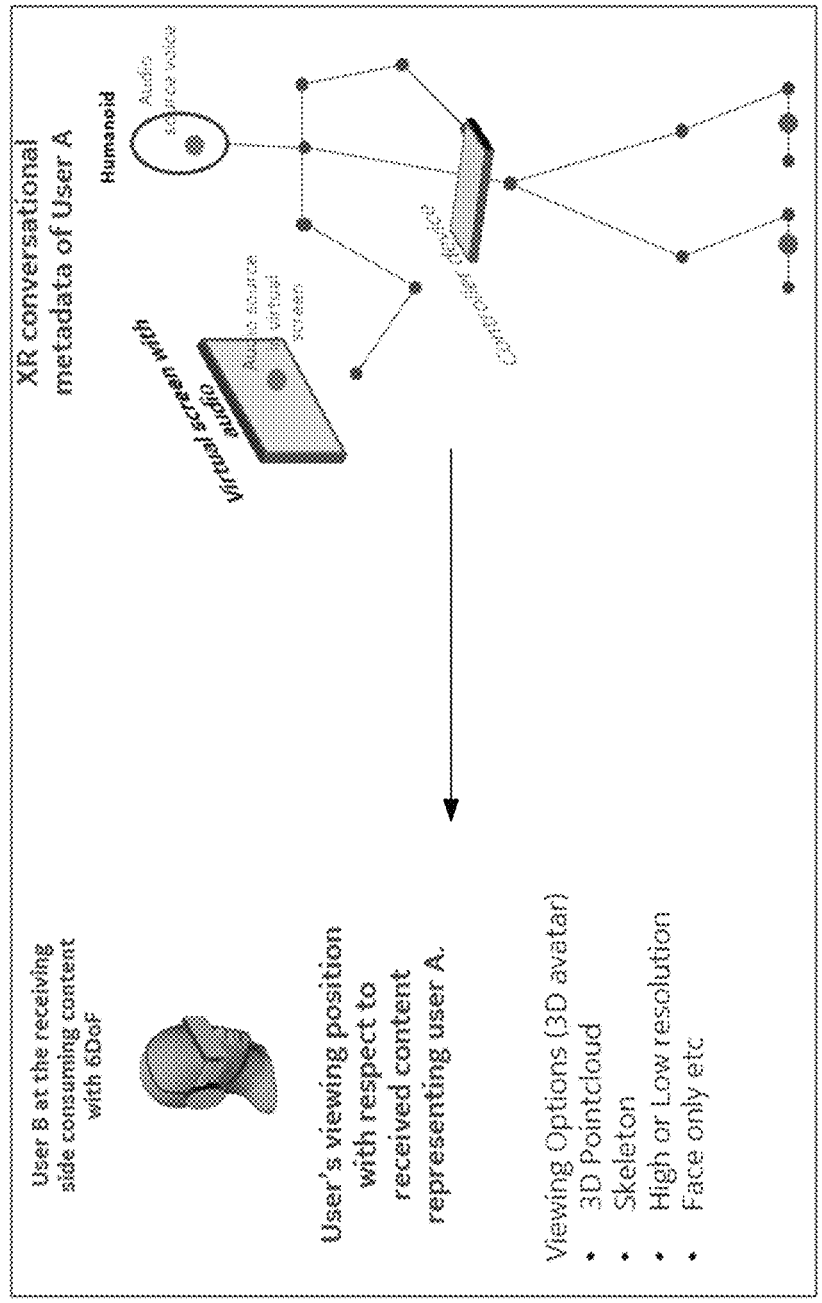
FIG. 12 shows an example of video and audio rendering capabilities.

As FIG. 12 shows, the metadata itself are abstract but with meaningful interdependencies and relation that makes it easy to recompose the 3D scene with user A's avatar embedded for accurate consumption by User B. Thanks to the proposed metadata structure, various scene object interface can be extracted, re-enact their 3D avatar which give rise to enjoyable 3D XR conversation.

In FIG. 12, the user B can directly view and communicate with the 3D avatar of user A through the HMD device. He/she can move around in the virtual scene and can interact, displace object in the scene. He/she also has various options to manipulate the detail of the avatar he/she can see and vice versa.

The high-level syntax of the parameter metadata is defined in the following Table 1:

TABLE 1

Parameter set

| Name | Type | Description | Required |
| --- | --- | --- | --- |
| description | String | Introductory description | No |
| name | String | Defines the name for global and local identification. | Yes |
| info | Sequence of String | Information specific to an object: call type, etc. | Yes |

TABLE 1-continued

Parameter set

| Name | Type | Description | Required |
| --- | --- | --- | --- |
| A-segment | Sequence of object | Creates segment defining sound classification with indexes (e.g., background noise, body parts, specific device sound). If not defined, sound is defined in global scene. | No |
| A-site | Sequence of object | Landmark point; can specify the location where to focus on for listenpoint. | No |
| children | Sequence of object | Hold sequence of objects that can form a connected hierarchy tree. This can span a linkage between human body parts and audio objects. | No |
| center | Float[3] | Center coordinate for an object. | |
| CenterOfMass | Float[3] | Center coordinate for an object anchoring other objects. | No |
| Translation | Float[3] | Displacement to a global coordinate. | No |
| Scale | | Amplification of sound or scaling a geometrical object. | No |
| Coordinates | Sequence of Float[3] | Define coordinate points of virtual object to encompass A-segment region in the scene. | No |

Embodiment

According to an example embodiment of the present solution, the proposed metadata enables timed parameters to be signaled between a sender and a server operations; and between a server and a receiver operations at high frequency. The server can contain a workflow-like framework such as ISO/IEC 23090-8 NBMP (network-based media processing) running in the cloud computing environments, that is used to manage operations regarding the call. Instead, the server can be a traditional centralized conversational media server such as multipoint control unit (MCU) in video conferencing systems as shown in FIG. 12.

Figure 13:
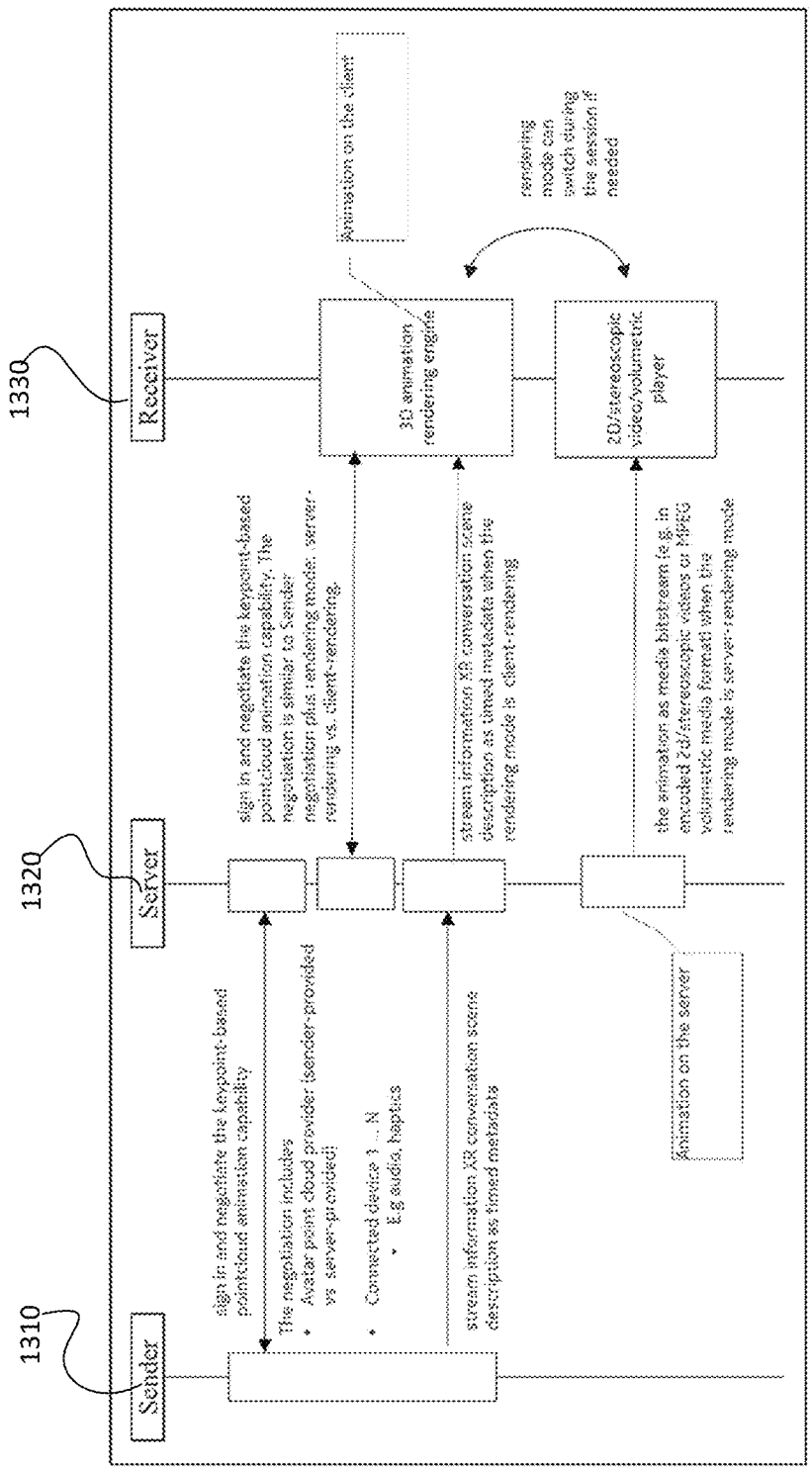
FIG. 13 shows an example of a 3D avatar call sequence involving a sender, server and receiver.

FIG. 13 illustrates an example of a 3D avatar conversational system based on proposed XR scene description, whereby a pointcloud is animated using skeletal information, and sent as part of a XR scene description metadata in order to create a low bandwidth conversational system. A sender 1310 starts by negotiating the animation capability modes with the server 1320 to indicate the type of conversation. The type of conversation is either a skeletal animation or direct pointcloud animation. All other connected devices also follow same negotiation. Since the whole conversation framework is described as the timed metadata, the design can also be applicable to systems support unicasting, multicasting, and broadcasting. NBMP supports deploying one to many workflows and the present embodiments assume one workflow supporting one conversational session for multiple senders and receivers and all associated connected devices. This setup can provide good scalability and support the flexible deployment in different cloud environments such as central and edge clouds.

The workflow manager selects and deploys the processing workflow (mainly the server task) into selected Media Processing Entities (the virtual machine, for example) and then performs the configuration of the tasks for conversation system. When the workflow starts, the session negotiation can be done between the Sender (NBMP source) 1310 and the server 1320. The negotiation indicates sender's 1310 capability of providing avatar metadata using the format according to present embodiments. When a receiver 1330 is connected to the session, the receiver 1330 follows the same negotiation process by indicating the receiver's 1330 rendering capability, connected devices information, and in particular, the animation/conversation mode preference. The preference can be different requirements for server-side animation or client-side animation. The rendering capability can be defined as one part of NBMP MPE capability so that the receiver 1330 can benefit from the dynamic migration of NBMP MPEs from the receiver end to the Cloud for cloud-based rendering. With the help of dynamic MPE capability in NBMP, the receiver 1330 can switch between the two rendering modes (cloud-side and client-side animations) at any time, for example, when the capability of the rendering HW is switched or changed from a high-end HMD device to a mobile player.

The proposed XR conversational metadata allow easy management of entities involved in 3D avatar conversation. When the avatar is displaced in the scene, every connected objects attached to the Avatar are seamlessly and dynamically displaced and updated to produce sense of presence and realism. With this approach it is also easy to update the virtual scene provided in classical scene description while maintaining the avatar's properties.

The solution as discussed above is not restricted to a single protocol and data format. The information carried using this invention can be carried over any transport protocol (such as SIP, SDP, HTTP DASH, RTP/RTCP, WebRTC and alike).

Figure 14A:
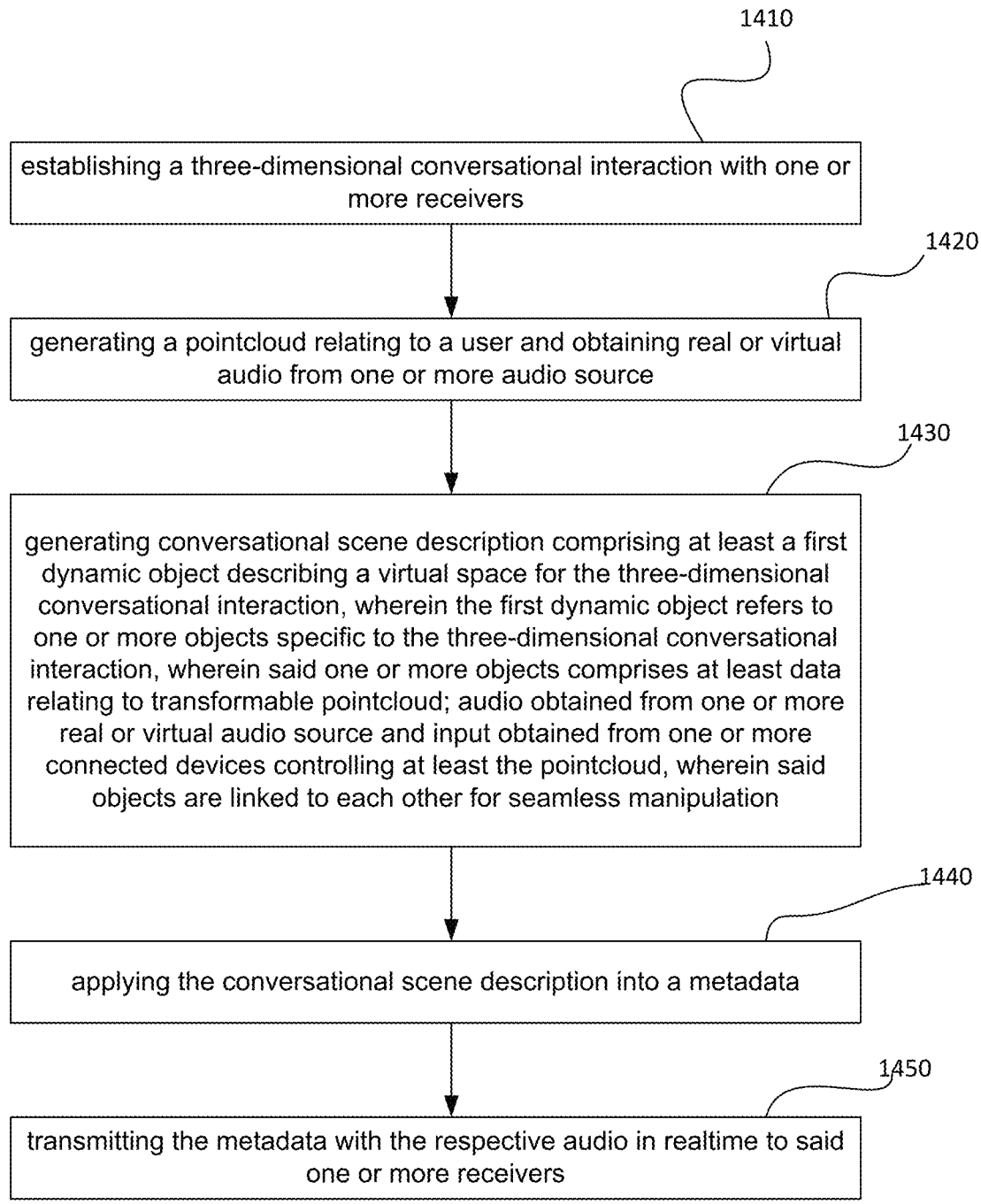
FIG. 14a is a flowchart illustrating a method according to an embodiment.

The method for a sender device according to an embodiment is shown in FIG. 14a. The method generally comprises establishing 1410 a three-dimensional conversational interaction with one or more receivers; generating 1420 a pointcloud relating to a user and obtaining real or virtual audio from one or more audio source; generating 1430 conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; applying 1440 the conversational scene description into a metadata, and transmitting 1450 the metadata with the respective audio in realtime to said one or more receivers. Each of the steps can be implemented by a respective module of a computer system.

A sender apparatus according to an embodiment comprises means for establishing a three-dimensional conversational interaction with one or more receivers; means for generating a pointcloud relating to a user and obtaining real or virtual audio from one or more audio source; means for generating conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; means for applying the conversational scene description into a metadata, and means for transmitting the metadata with the respective audio in realtime to said one or more receivers. The means comprises at least one processor, and a memory including a computer program code, wherein the processor may further comprise processor circuitry. The memory and the computer program code are configured to, with the at least one processor, cause the apparatus to perform the method of FIG. 14a according to various embodiments.

Figure 14B:
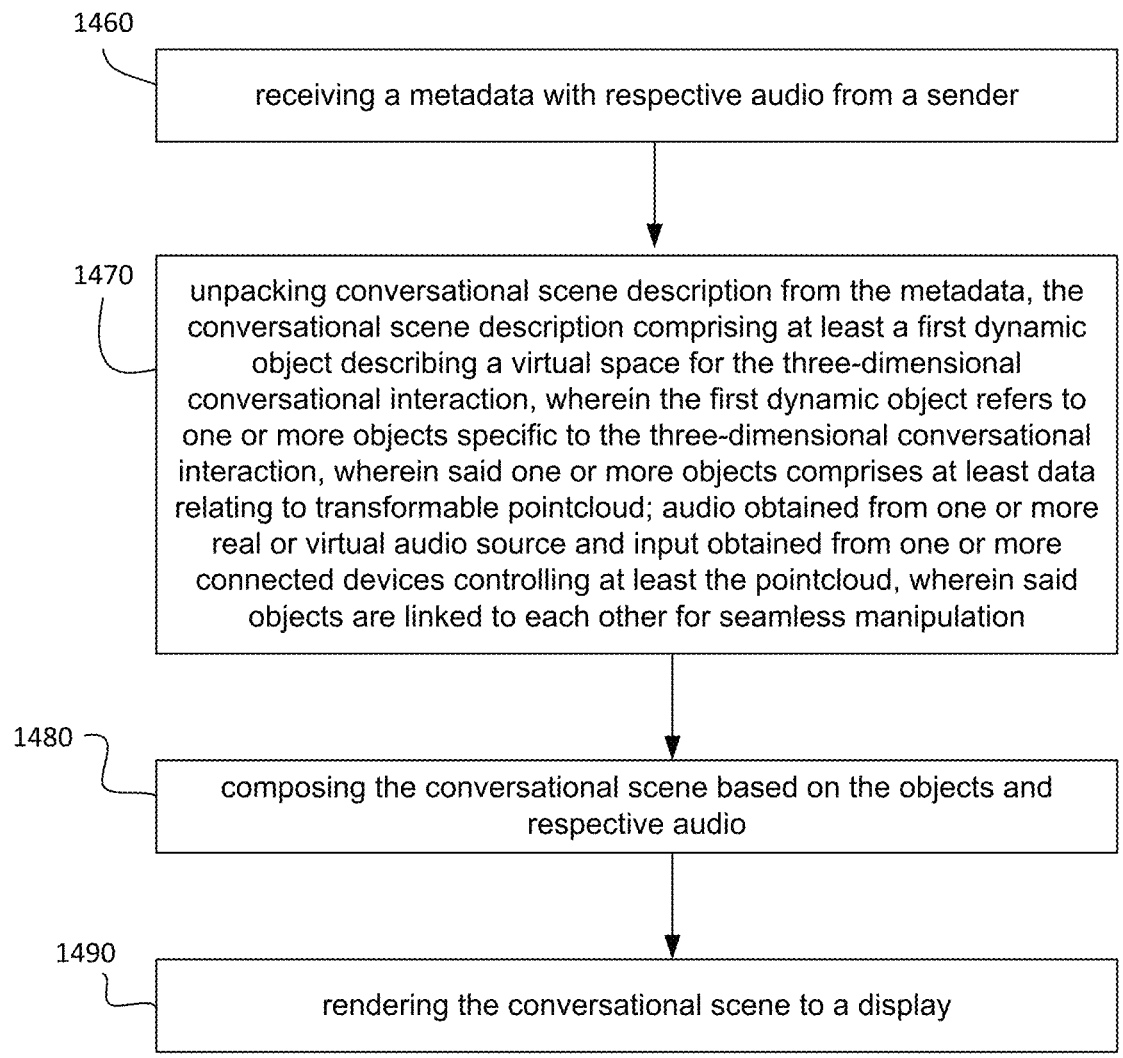
FIG. 14b is a flowchart illustrating a method according to another embodiment.

The method for a receiver device according to an embodiment is shown in FIG. 14b. The method generally comprises receiving 1460 a metadata with respective audio from a sender; unpacking 1470 conversational scene description from the metadata, the conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; composing 1480 the conversational scene based on the objects and respective audio; and rendering 1490 the conversational scene to a display.

A receiver apparatus according to an embodiment comprises means for receiving a metadata with respective audio from a sender; means for unpacking conversational scene description from the metadata, the conversational scene description comprising at least a first dynamic object describing a virtual space for the three-dimensional conversational interaction, wherein the first dynamic object refers to one or more objects specific to the three-dimensional conversational interaction, wherein said one or more objects comprises at least data relating to transformable pointcloud; audio obtained from one or more real or virtual audio source and input obtained from one or more connected devices controlling at least the pointcloud, wherein said objects are linked to each other for seamless manipulation; means for composing the conversational scene based on the objects and respective audio; and means for rendering the conversational scene to a display. The means comprises at least one processor, and a memory including a computer program code, wherein the processor may further comprise processor circuitry. The memory and the computer program code are configured to, with the at least one processor, cause the apparatus to perform the method of FIG. 14b according to various embodiments.

Figure 15:
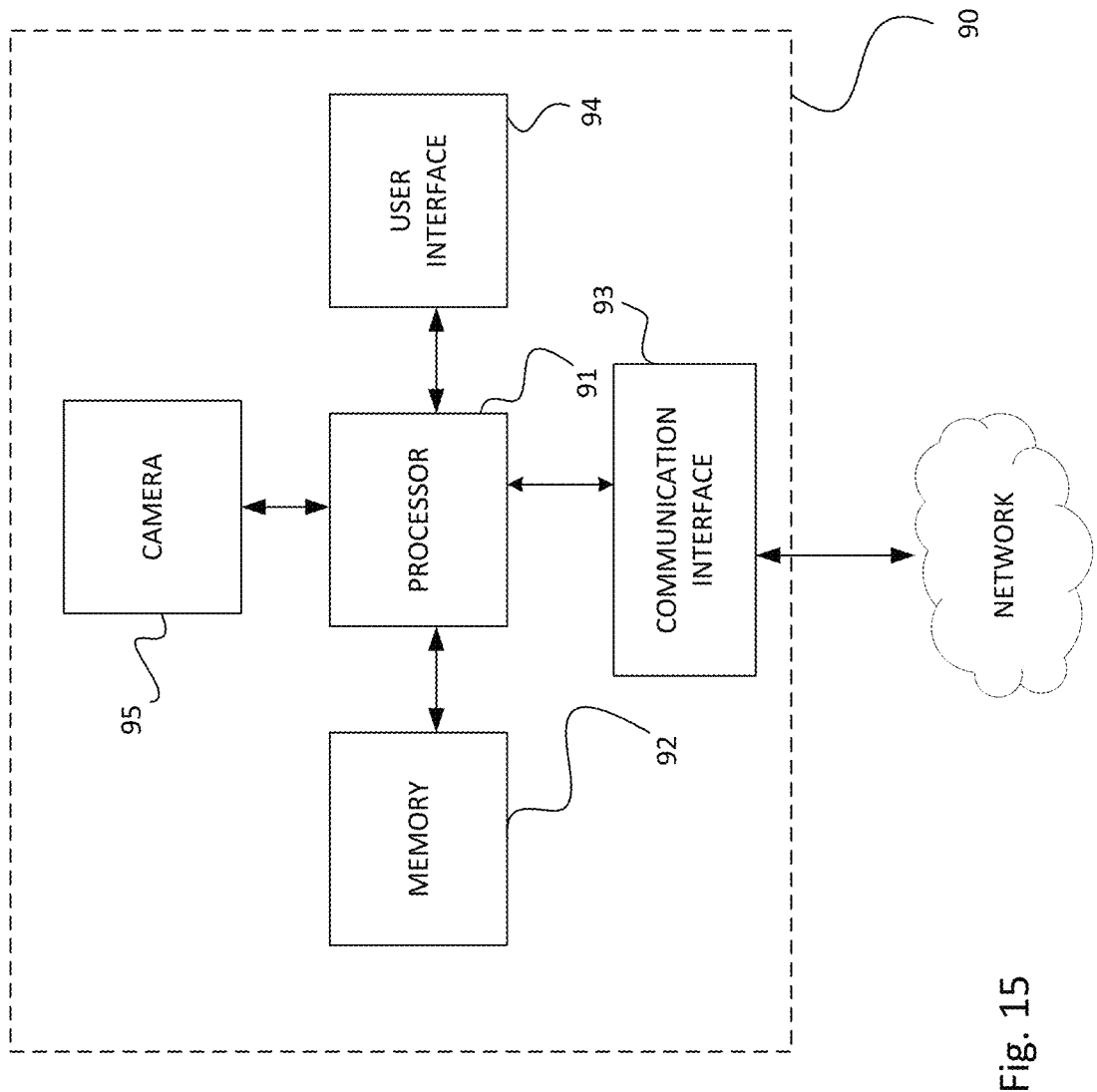
FIG. 15 shows an apparatus according to an example.

An apparatus according to an embodiment is illustrated in FIG. 15. The apparatus is a user equipment for the purposes of the present embodiments. The apparatus 90 comprises a main processing unit 91, a memory 92, a user interface 94, a communication interface 93. The apparatus according to an embodiment, shown in FIG. 10, may also comprise a camera module 95. Alternatively, the apparatus may be configured to receive image and/or video data from an external camera device over a communication network. The memory 92 stores data including computer program code in the apparatus 90. The computer program code is configured to implement the method according various embodiments by means of various computer modules. The camera module 95 or the communication interface 93 receives data, in the form of images or video stream, to be processed by the processor 91. The communication interface 93 forwards processed data, i.e. the image file, for example to a display of another device, such a virtual reality headset. When the apparatus 90 is a video source comprising the camera module 95, user inputs may be received from the user interface.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising:
   at least one processor;
   at least one memory storing instructions that, when executed by the at least one processor, cause the apparatus at least to:
   establish a three-dimensional conversational interaction with one or more receivers;
   wherein the three-dimensional conversational interaction is established by indicating animation capability modes;
   wherein the indicating of the animation capability modes used to establish the three-dimensional conversational interaction is performed during a negotiation session with a server or with the one or more receivers;
   wherein the animation capability modes comprise animation capability modes of the apparatus, and the apparatus comprises a sender device or a sender device comprises the apparatus;
   generate a transformable point cloud relating to a user and obtain real or virtual audio from one or more real or virtual audio sources;
   generate a conversational scene description comprising at least a first dynamic object describing a virtual space for the three-dimensional conversational interaction, wherein the first dynamic object is represented as a container that includes one or more objects specific to the three-dimensional conversational interaction, wherein said one or more objects comprise at least data relating to the transformable point cloud, the real or virtual audio obtained from the one or more real or virtual audio sources, or an input obtained from one or more connected devices controlling at least the point cloud, and wherein said objects are linked to each other for seamless manipulation;
   apply the conversational scene description into metadata; and
   transmit the metadata with the respective audio to said one or more receivers.

2. The apparatus according to claim 1, wherein the point cloud represents a three-dimensional avatar humanoid with or without skeletal key points.

3. The apparatus according to claim 1, wherein the audio is segmented into audio sources.

4. The apparatus according to claim 1, wherein objects being referred from the conversational scene description are connected to one another by a same geometrical coordinate system relative to one global origin.

5. The apparatus according to claim 1, wherein the animation capability modes comprise a skeletal animation or a point cloud animation.

6. The apparatus of claim 1, wherein the container includes a respective data type of the one or more objects.

7. The apparatus of claim 1, wherein the apparatus is caused to:
   classify the real or virtual audio into audio segments based on a respective type of the real or virtual audio;
   wherein the real or virtual audio is classified into the audio segments using a neural network or machine learning model.

8. The apparatus of claim 1, wherein the apparatus is caused to:
   store a sequence of at least one audio segment object representing at least one audio segment of the real or virtual audio as a child object of an audio object used to represent the real or virtual audio.

9. The apparatus of claim 1, wherein the apparatus is caused to:
   represent a real or virtual audio source of the one or more real or virtual audio sources as an audio site object, wherein an audio object included within the container that represents the first dynamic object describing the virtual space for the three-dimensional conversational interaction includes a sequence of audio site objects within a container used to represent the audio object, wherein the sequence of audio site objects include the audio site object.

10. The apparatus of claim 1, wherein the apparatus is caused to:
    store a sequence of listenpoint objects within a container that represents an audio object that is included within the container that represents the first dynamic object describing the virtual space for the three-dimensional conversational interaction;
    wherein a listenpoint object of the listenpoint objects represents a point where a subject of the three-dimensional conversational interaction listens to the real or virtual audio emanating from the one or more real or virtual audio sources.

11. The apparatus of claim 1, wherein the conversational scene description comprises at least a second dynamic object describing a physical space for the three-dimensional conversational interaction, wherein the second dynamic object is represented as another container that includes one or more other objects specific to the three-dimensional conversational interaction.

12. The apparatus of claim 1, wherein the apparatus is further caused to:

store a sequence of at least one audio site object as a child object of an audio segment object, wherein the at least one audio site object defines where to place the real or virtual audio for hearing at a location defined with an audio segment represented with the audio segment object, wherein the audio segment defines a type of the real or virtual audio.

13. An apparatus comprising:
at least one processor;
at least one memory storing instructions that, when executed by the at least one processor, cause the apparatus at least to:
establish a three-dimensional conversational interaction by indicating animation capability modes;
wherein the three-dimensional conversational interaction is established by indicating animation capability modes;
wherein the indicating of the animation capability modes used to establish the three-dimensional conversational interaction is performed during a negotiation session with a server or with a sender;
wherein the animation capability modes comprise animation capability modes of the apparatus, and the apparatus comprises a receiver device or a receiver device comprises the apparatus;
receive metadata with respective audio from the sender;
unpack a conversational scene description from the metadata, the conversational scene description comprising at least a first dynamic object describing a virtual space for the three-dimensional conversational interaction, wherein the first dynamic object is represented as a container that includes one or more objects specific to the three-dimensional conversational interaction, wherein said one or more objects comprise at least data relating to a transformable point cloud, audio obtained from one or more real or virtual audio sources, or input obtained from one or more connected devices controlling at least the point cloud, and wherein said objects are linked to each other for seamless manipulation;
compose a conversational scene described with the conversational scene description based on the objects and the respective audio; and
render the conversational scene to a display.

14. The apparatus according to claim 13, wherein the point cloud represents a three-dimensional avatar humanoid with or without skeletal key points.

15. The apparatus according to claim 13, wherein the audio is segmented into audio sources.

16. The apparatus according to claim 13, wherein objects being referred from the conversational scene description are connected to one another by a same geometrical coordinate system relative to one global origin.

17. The apparatus according to claim 13, wherein the animation capability modes comprise a skeletal animation or a point cloud animation.

18. A method, comprising:
establishing a three-dimensional conversational interaction with one or more receivers;
wherein the three-dimensional conversational interaction is established by indicating animation capability modes;
wherein the indicating of the animation capability modes used to establish the three-dimensional conversational interaction is performed during a negotiation session with a server or with the one or more receivers;
wherein the animation capability modes comprise animation capability modes of a sender device;
generating a transformable point cloud relating to a user and obtaining real or virtual audio from one or more real or virtual audio sources;
generating a conversational scene description comprising at least a first dynamic object describing a virtual space for the three-dimensional conversational interaction, wherein the first dynamic object is represented as a container that includes one or more objects specific to the three-dimensional conversational interaction, wherein said one or more objects comprise at least data relating to the transformable point cloud, the real or virtual audio obtained from the one or more real or virtual audio sources, or an input obtained from one or more connected devices controlling at least the point cloud, and wherein said objects are linked to each other for seamless manipulation;
applying the conversational scene description into metadata; and
transmitting the metadata with the respective audio to said one or more receivers.

19. A method, comprising:
establishing a three-dimensional conversational interaction by indicating animation capability modes;
wherein the three-dimensional conversational interaction is established by indicating animation capability modes;
wherein the indicating of the animation capability modes used to establish the three-dimensional conversational interaction is performed during a negotiation session with a server or with a sender;
wherein the animation capability modes comprise animation capability modes of the apparatus, and the apparatus comprises a receiver device or a receiver device comprises the apparatus;
receiving metadata with respective audio from the sender;
unpacking a conversational scene description from the metadata, the conversational scene description comprising at least a first dynamic object describing a virtual space for the three-dimensional conversational interaction, wherein the first dynamic object is represented as a container that includes one or more objects specific to the three-dimensional conversational interaction, wherein said one or more objects comprise at least data relating to a transformable point cloud, audio obtained from one or more real or virtual audio sources, or an input obtained from one or more connected devices controlling at least the point cloud, and wherein said objects are linked to each other for seamless manipulation;
composing a conversational scene described with the conversational scene description based on the objects and the respective audio; and
rendering the conversational scene to a display.

20. An apparatus comprising:
at least one processor;
at least one memory storing instructions that, when executed by the at least one processor, cause the apparatus at least to:
establish a three-dimensional conversational interaction with one or more receivers;
generate a transformable point cloud relating to a user and obtain real or virtual audio from one or more real or virtual audio sources;
store a sequence of at least one audio segment object representing at least one audio segment of the real or virtual audio as a child object of an audio object used to represent the real or virtual audio;

generate a conversational scene description comprising at least a first dynamic object describing a virtual space for the three-dimensional conversational interaction, wherein the first dynamic object is represented as a container that includes one or more objects specific to the three-dimensional conversational interaction, wherein said one or more objects comprise at least data relating to the transformable point cloud, the real or virtual audio obtained from the one or more real or virtual audio sources, or an input obtained from one or more connected devices controlling at least the point cloud, and wherein said objects are linked to each other for seamless manipulation;

apply the conversational scene description into a metadata; and transmit the metadata with the respective audio to said one or more receivers.

21. An apparatus comprising:

at least one processor;

at least one memory storing instructions that, when executed by the at least one processor, cause the apparatus at least to:

establish a three-dimensional conversational interaction with one or more receivers;

generate a transformable point cloud relating to a user and obtain real or virtual audio from one or more real or virtual audio sources;

store a sequence of at least one audio site object as a child object of an audio segment object, wherein the at least one audio site object defines where to place the real or virtual audio for hearing at a location defined with an audio segment represented with the audio segment object, wherein the audio segment defines a type of the real or virtual audio;

generate a conversational scene description comprising at least a first dynamic object describing a virtual space for the three-dimensional conversational interaction, wherein the first dynamic object is represented as a container that includes one or more objects specific to the three-dimensional conversational interaction, wherein said one or more objects comprise at least data relating to the transformable point cloud, the real or virtual audio obtained from the one or more real or virtual audio sources, or an input obtained from one or more connected devices controlling at least the point cloud, and wherein said objects are linked to each other for seamless manipulation;

apply the conversational scene description into a metadata; and transmit the metadata with the respective audio to said one or more receivers.

22. An apparatus comprising:

at least one processor;

at least one memory storing instructions that, when executed by the at least one processor, cause the apparatus at least to:

receive a metadata with respective audio from a sender;

unpack a conversational scene description from the metadata, the conversational scene description comprising at least a first dynamic object describing a virtual space for a three-dimensional conversational interaction, wherein the first dynamic object is represented as a container that includes one or more objects specific to the three-dimensional conversational interaction, wherein said one or more objects comprise at least data relating to a transformable point cloud, real or virtual audio obtained from one or more real or virtual audio sources, or input obtained from one or more connected devices controlling at least the point cloud, and wherein said objects are linked to each other for seamless manipulation;

wherein the conversational scene description unpacked from the metadata comprises a sequence of at least one audio segment object representing at least one audio segment of the real or virtual audio stored as a child object of an audio object used to represent the real or virtual audio;

compose a conversational scene described with the conversational scene description based on the objects and the respective audio; and render the conversational scene to a display.

23. An apparatus comprising:

at least one processor;

at least one memory storing instructions that, when executed by the at least one processor, cause the apparatus at least to:

receive a metadata with respective audio from a sender;

unpack a conversational scene description from the metadata, the conversational scene description comprising at least a first dynamic object describing a virtual space for a three-dimensional conversational interaction, wherein the first dynamic object is represented as a container that includes one or more objects specific to the three-dimensional conversational interaction, wherein said one or more objects comprise at least data relating to a transformable point cloud, real or virtual audio obtained from one or more real or virtual audio sources, or input obtained from one or more connected devices controlling at least the point cloud, and wherein said objects are linked to each other for seamless manipulation;

wherein the conversational scene description unpacked from the metadata comprises a sequence of at least one audio site object stored as a child object of an audio segment object, wherein the at least one audio site object defines where to place the real or virtual audio for hearing at a location defined with an audio segment represented with the audio segment object, wherein the audio segment defines a type of the real or virtual audio;

compose a conversational scene described with the conversational scene description based on the objects and the respective audio; and render the conversational scene to a display.

* * * * *